May 9, 1961 C. A. ZDANOWICH 2,983,913
CODE TRANSLATOR
Filed Dec. 3, 1956
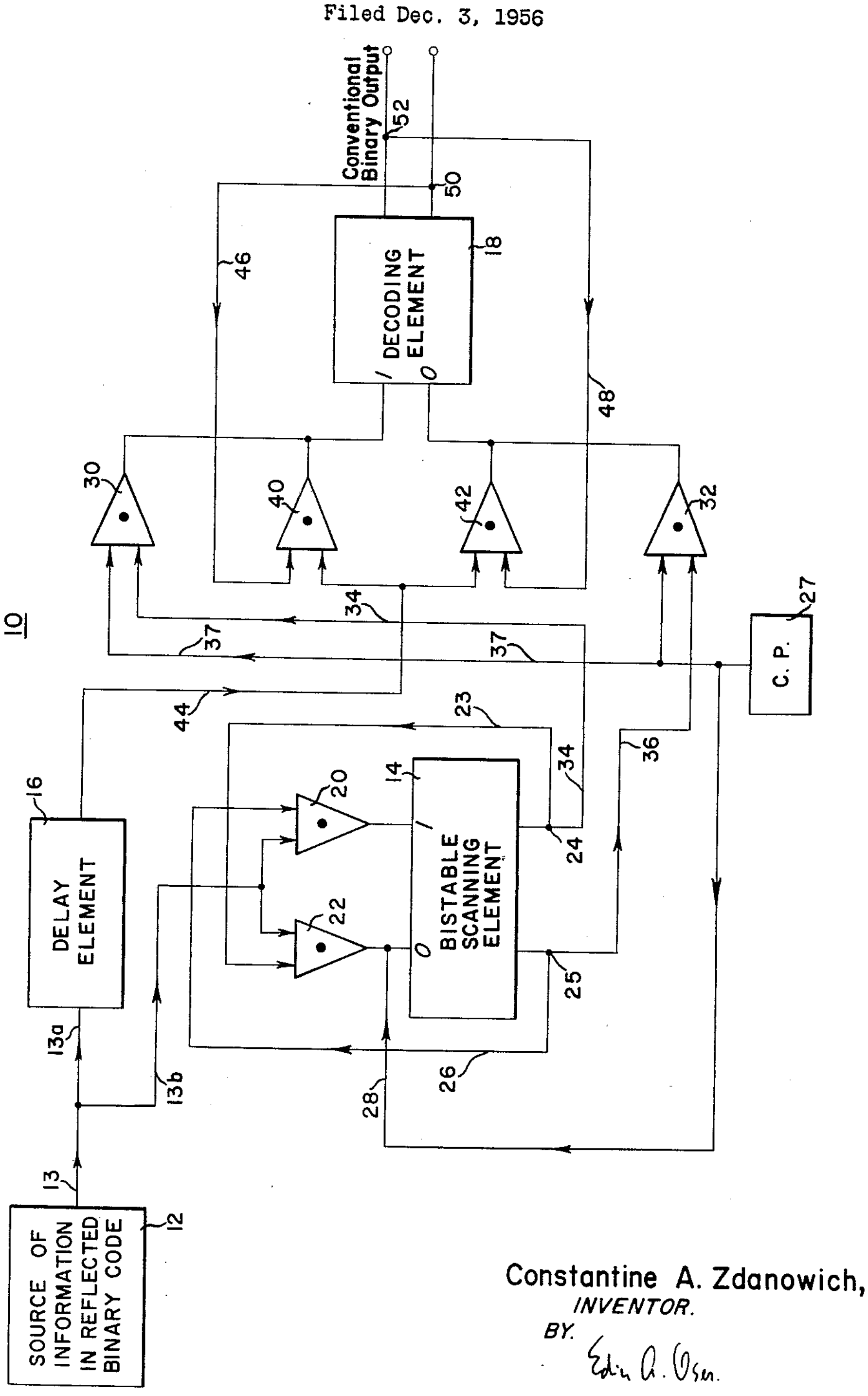
Constantine A. Zdanowich,
*INVENTOR.*
*BY* Edwin A. Olsen
*AGENT.*

United States Patent Office 2,983,913

Patented May 9, 1961

2,983,913

CODE TRANSLATOR

Constantine A. Zdanowich, Gardena, Calif., assignor to Hughes Aircraft Company, Culver City, Calif., a corporation of Delaware Filed Dec. 3, 1956, Ser. No. 626,804

4 Claims. (Cl. 340—347)

This invention relates to code translation and more particularly to the translation of a train of binary characters representing information in one form of binary code into a different train of binary characters representing the same information in another form of binary code.

Information is presently represented by various binary codes and the selection of any one particular code is generally interrelated with the details of the system or machine in which the coded information is to be employed. Two binary codes which are presently used, in systems such as pulse code modulation systems or digital computing machines, are known as a "reflected" or Gray binary code and a "conventional" binary code. The binary coded information is generally represented by binary characters having two values commonly identified by the digits "1" and "0," and which terminology will be employed herein. These binary characters may be manifested in various modes, again depending upon the system or machine. Some of these bivalued manifestations may take the form of pulses, steady voltage levels or magnetic states. These binary characters are usually further grouped into blocks of information termed words or numbers and by this grouping any type of information may be represented for processing in the associated system.

The advantage of using a reflected binary code for coding decimal numbers is that in shifting between successive decimal numbers there is a change of only one digit at a time. This property of the reflected code prevents any large errors at the cross-over between successive digits, as may occur when the conventional binary code is employed. However, one of the disadvantages of the reflected binary code is that there is not presently known any convenient method to mathematically manipulate the code form and the information must necessarily be converted from the reflected binary coding to conventional binary or into the decimal system before application to arithmetic units in digital computers, for example. This implies that the conventional binary code is readily adaptable to mathematical computations in high speed digital computers, as it is.

In high speed digital machines wherein the conventional binary code is employed and which machines operate on serial trains of information, as opposed to parallel operation, the coded information is generally arranged to receive the information with the least significant digit first. Heretofore, the simplest arrangements for translating information from the reflected binary code to the conventional binary code, in particular for serial operation, produce the conventional binary coded information with the most significant digit first. Accordingly, a reversing process is required for this type of information before it can be read into a serial computing machine.

It is therefore a general object of this invention to provide an improved and simple code translator for translating from one binary code to a different binary code with a minimum of apparatus and requiring a decrease in operational time.

It is another object of this invention to provide an improved code translator for translating a serial train of binary characters coded in the reflected binary code to the conventional binary code with least significant digit first without resorting to a reversing process.

In accordance with this invention a novel and improved code translator is provided wherein coded information is received in accordance with a reflected binary code and changed to represent the same information in the conventional binary code. The input information, represented in the reflected binary code, is presented to the code translator as a serial train of binary characters with the least significant digit first and the resulting output is converted to represent the same information in a conventional binary code as a serial train of binary characters, least significant digit first. The translation is effected by applying the input information train to a scanning counter element to first determine whether the number of binary characters of a predetermined or first kind is odd or even. The scanning element is arranged to be responsive to only the binary characters of the first kind to thereby set the scanning element in a corresponding odd or even state. Substantially simultaneously with the application of the input train to the scanning element, the input train is applied to a delay element arranged to have a predetermined time delay. While the input train is passing through the delay element and upon completion of the application of the input train, representing one block of information to the scanning element, the final state of the scanning element is transferred to a decoding element. This decoding element is also arranged to be responsive only to binary characters of a first kind. The decoding element, upon being thus set, receives the input train emerging from the delay element so that the output of the decoding element represents the original or input information in conventional binary code. The scanning element may be reset upon transfer of its state to the decoding element and is thereby readied to receive the next group or block of information while the previous train is being decoded.

Further and additional objects and advantages will become apparent hereinafter during the detailed description of an embodiment of the invention which is to follow and which is illustrated in the accompanying drawing wherein the single view is a block and circuit diagram of a code translator embodying the invention.

Referring to the drawing, the construction and operation of novel code translator 10 will now be described. The code translator 10 shown is operative on a serial train of binary characters coded in accordance with the reflected binary code for translating the train into a different train coded in the conventional binary code, both trains arranged with the least significant digit first. The input train is derived from a source shown as a block identified by the reference character 12. The serial train of information provided by the block 12 is coupled by means of parallel paths into a scanning counter element 14 and to a delay element 16. The delay element 16 is arranged to have a time delay such that the entire train of input information has been applied to the scanning element 14 prior to the emergence of the train from the delay element 16. This time delay arrangement will become more apparent from the description to follow. Upon completion of the application of the input train to the scanning element 14, the final state thereof is transferred to decoding element 18. This transfer operation is followed by the coupling of the train from the delay element 16 to decoding element 18 whereby the information derived therefrom is represented in the conventional binary code.

The characteristic of the source of information 12, for the purposes of this invention, is to provide a serial train of binary characters represented in the reflected binary code with the least significant binary digit first. It will be understood by those skilled in the art that the information provided at the source 12 may represent any form of intelligence such as an instantaneous message sample, the angular position of a shaft or a decimal number. The source 12, for example, may be an analogue to digital converter such as the cathode ray tube arrangement described in the Computer Issue of the "Proceedings of the IRE" for October 1953, on pages 1462–1465, in an article entitled "An Analogue to Digital Converter for Serial Computing Machines." Various other digitizing techniques known to the art are further described in the aforementioned publication in an article entitled "A Survey of Analog-to-Digital Converters" beginning on page 1455 thereof.

The pulse train provided by the source 12 at the output 13 is applied substantially simultaneously to the scanning element 14 and to the delay element 16 by the respective parallel paths provided by the lead wires $13^a$ and $13^b$. The scanning counter element 14 may be any of the well known bistable storage elements known in the art, such as the conventional Eccles-Jordan multivibrator circuit. In the embodiment illustrated, the bistable scanning element 14 is represented as a static device having a pair of input circuits and a corresponding pair of output circuits. The binary characters or stimuli derived from the scanning element 14 are considered as manifested as bivalued steady voltage signals, in response to the input stimuli which may be pulses or voltage signals. The two input circuits for the element 14 are identified by the digits "1" and "0" and each input circuit is provided with a logical "and" gate for controlling the input stimuli to the element 14. The "and" gate for the "1" input circuit of scanning element 14 is identified by the reference character 20 while the "and" gate 22 is provided for the "0" input circuit.

The input serial train is coupled into gates 20 and 22 from the source 12 by means of the lead $13^b$ having parallel branches connected to one of the input circuits for each of the gates. The remaining input circuits for the gates 20 and 22 are connected to the opposite output circuits for scanning element 14. This arrangement is provided by a lead 23 connected between the output circuit 24, corresponding to the "1" input, and the remaining input circuit for gate 22, while the "0" output circuit 25 is similarly connected to the gate 20 by means of a lead 26. The gates 20 and 22 are arranged in this instance to be responsive to binary characters of a first kind, that is, characters representative of the digit "1" manifested by the higher of the bivalued voltages. A clock pulse source 27 provides the stimuli for resetting the scanning element 14 and transferring the final state thereof to decoding element 18 after each block of information has been coupled to the scanning element 14. The resetting stimulus is coupled from clock pulse source 27 to the "0" input of scanning element 14 by means of lead wire 28. The resetting stimulus is effective to place the scanning element 14 in the "0" state for receiving the succeeding block of information. The resetting operation occurs substantially simultaneously with the transfer of the final state of element 14 to element 18, as will be described.

The output signals derived from scanning element 14 are coupled into the decoding element 18 shown as a bistable switching element also having the conventional "1" and "0" input circuits and which circuits are controlled through respective "and" gates 30 and 32 provided therefor. The output circuit 24 is directly connected to the input circuit of gate 30 by means of a lead 34 connected therebetween, while the output circuit 25 is directly connected to the input of gate 32 through the connection afforded by a lead 36. The remaining input circuits for each of the gates 30 and 32 are connected in common by means of lead 37 to clock pulse source 27. The stimulus provided by clock pulse source 27 is arranged to control the transfer of the final state of scanning element 14, and the inherent delay in the element 14 allows this transfer to be effective prior to the resetting of the element 14, as is well known in the art.

The input information derived from the delay element 16 is also coupled into the decoding element 18 by means of another pair of logical "and" circuits therefor, identified by the reference characters 40 and 42, respectively, controlling the "1" and "0" inputs. The input serial train is coupled from delay element 16 by means of the lead 44, and which lead is coupled in common with one of the inputs for each of the gates 40 and 42. The remaining stimulus for the input for "and" gate 40 is provided by the output circuit 50, corresponding to the "0" input, of decoding element 18 by means of the lead wire 46, which the remaining stimulus for gate 42 is connected to the output circuit 52, corresponding to the "1" input, of element 18 through lead 48. The gates 40 and 42 for decoding element 18 are similar to the gates 20 and 22 provided for element 14 and are also arranged to be responsive only to binary characters representative of the digit "1." The output circuits 50 and 52 for decoding element 18 provide the coded information in the conventional binary code. It should be noted that no reset stimulus for decoding element 18 is necessary since it will always be set in the "0" state after each block of information, as will become evident from the decoding example to be described immediately hereinafter.

The type of "and" gates represented for controlling the inputs to elements 14 and 18 may be any suitable type which is well known in the art. One example of a suitable type of gate will be found in the Proceedings of the IRE for May 1950, in an article on page 511 by Tung Chang Chen, entitled "Diode Coincidence and Mixing Circuits in Digital Computers."

An examination of the decoding operation of the code translator 10 will now be made by following through a typical conversion from the reflected binary code to the conventional binary code, with reference to the table below, showing the relationship between the decimal numbers and the reflected and binary coding. This relationship is shown in terms of four binary bits, it being understood that the representation may be in terms of any number of binary bits. The least significant digit is shown at the right for each binary code.

| Decimal | Reflected binary | Conventional binary |
|---|---|---|
| 0 | 0000 | 0000 |
| 1 | 0001 | 0001 |
| 2 | 0011 | 0010 |
| 3 | 0010 | 0011 |
| 4 | 0110 | 0100 |
| 5 | 0111 | 0101 |
| 6 | 0101 | 0110 |
| 7 | 0100 | 0111 |
| 8 | 1100 | 1000 |
| 9 | 1101 | 1001 |
| 10 | 1111 | 1010 |
| 11 | 1110 | 1010 |
| 12 | 1010 | 1100 |
| 13 | 1011 | 1101 |
| 14 | 1001 | 1110 |
| 15 | 1000 | 1111 |

Assuming that the source of information from the block 12 represents the decimal digit 9, it may be seen from the above table that the corresponding reflected binary representation is 1101. It may be readily appreciated from an inspection of this representation that the number of 1's for the decimal digit 9 is three, an odd number. Accordingly, the scanning element 14 is arranged to be responsive to these characters to alternately set the element between its two states, so that at the end of the information block the output 24 will be high. This may be seen to be the correct final state, if it will be recalled, from the discussion hereinabove, that the scanning element 14 is initially in the "0" state, output 25 being high. This final state of the scanning element 14 is now transferred to the decoding element 18 and which element it is desired to also place in the "1" state, output 52 high. This transfer is effected by the provision of the stimulus from the clock pulse source 27 at this time and which stimulus is applied to both "and" gates 30 and 32 in combination with the stimulus at outputs 24 and 25 of scanning element 14. Since only output 24 is high, only gate 30 passes a signal to decoding element 18. This action activates the "1" input of element 18 and makes the corresponding output 52 high. This output signal at 52 is identified as the first or least significant digit of the output signal train representing the input information in the conventional binary code. From an inspection of the above table, this is seen to be the correct binary character.

Upon effecting this transfer between elements 14 and 18 the input serial train is now applied to the decoding element 18 by means of "and" gates 40 and 42. Since the gates 40 and 42 are only responsive to binary "1's," and the first digit derived from the delay element 16 is a "1," it will switch the decoding element 18 to the "0" state wherein the second digit in the conventional binary code representation will be a "0" since output 52 is now low. The next digit derived from delay element 16 and applied to decoding element 18 is a "0" and accordingly there is no change in the signal at output 52, and therefore the corresponding output digit is again a "0." The third digit similarly applied to decoding element 18 is a "1" and this digit will switch the decoding element back to the "1" state and set output 52 high again. This output train, 1001, is seen as the complete translation of the decimal digit 9 from reflected to conventional binary coding. The last or most significant digit of the reflected binary information is a "1," and is utilized to switch the decoding element 18 back into the "0" state.

If the information that is to be decoded has an even number of "1's" in the reflected binary representation, such as for the decimal digit 10, it will now be appreciated that the scanning and transfer operation will set the decoding element 18 in the "0" state. Accordingly, the even number of "1's" applied thereto will reset the element 18 to the "0" state. The input train 1111, for the decimal digit 10, applied to decoding element 18 will alternately switch the element between its stable states to provide the output train 1010. The most significant digit or the fourth "1" will set the element 18 to the "0" state.

There has thus been disclosed an improved code translator for translating information represented in the reflected binary code to the conventional binary code in the form of a serial train, least significant digit first with a minimum of apparatus and time and without resorting to a reversing process.

What is claimed is:

1. A system for translating a number in reflected binary code into conventional binary code, said number being represented by a serial train of binary signals arranged with the least significant digit first comprising a first bistable storage element having a pair of input circuits and a pair of output circuits, individual gating circuits for each of said input circuits, time delay means, means for applying the serial train of binary signals in reflected binary code, least significant digit first, substantially simultaneously to each of said gating circuits and said time delay means, a second bistable storage element coupled to said time delay means to receive the train of binary signals emerging therefrom, and means coupled with said output circuits for transferring the state of said first bistable element to said second bistable element at the completion of the application of said binary signals to said first bistable element and before the first binary signal emerges from said time delay means.

2. A system for translating a number in reflected binary code into conventional binary code, said number being represented by a serial train of binary signals arranged with the least significant digit first, comprising; a first bistable storage element having an input circuit and an output circuit for each stable state, separate gating circuits connected to each of said input circuits, each of said gating circuits being connected to be responsive to the electrical signal provided at the output circuit for the opposite stable state, time delay means, means for applying the serial train of binary signals, least significant digit first, substantially simultaneously to each of said gating circuits and to said time delay means, a second bistable storage element having an input circuit and an output circuit for each stable state, a pair of separate gating circuits connected to each of said input circuits, one pair of said gating circuits being connected to be responsive to a plurality of input signals including the output signal provided at the output circuit for the opposite stable state, said one pair of gating circuits for said second bistable element being further connected to receive the train of binary signals emerging from said time delay means, an electrical connection between each output circuit of said first bistable element to one of the gating circuits of the other pair of gating circuits to said second bistable element corresponding to the same bistable state, and means coupled to each of said last mentioned pair of gating circuits for transferring the final state of said first bistable element to said second bistable element prior to the arrival of the train of binary signals from said time delay means.

3. A system for translating a number in reflected binary code into a conventional binary code as defined in claim 2 wherein each of the gating circuits are logical "and" gates.

4. A system for translating a number in reflected binary code into conventional binary code as defined in claim 2 wherein said gating circuits for each input of said second bistable element are coincidence circuits and wherein said transferring means includes means for resetting the first bistable element to a predetermined state substantially simultaneously with said transfer.

References Cited in the file of this patent

UNITED STATES PATENTS

| | | |
|---|---|---|
| 2,401,621 | Desch et al. | June 4, 1946 |
| 2,571,680 | Carbrey | Oct. 16, 1951 |
| 2,621,250 | Spencer | Dec. 9, 1952 |
| 2,632,058 | Gray | Mar. 17, 1953 |
| 2,660,618 | Argrain | Nov. 24, 1953 |
| 2,700,696 | Barker | Jan. 25, 1955 |
| 2,755,459 | Carbrey | July 17, 1956 |
| 2,762,563 | Samson | Sept. 11, 1956 |